Aug. 19, 1969     J. J. TIEMANN ET AL     3,462,223
OPTICAL STRAIN GAUGE
Filed Oct. 21, 1965     2 Sheets-Sheet 1
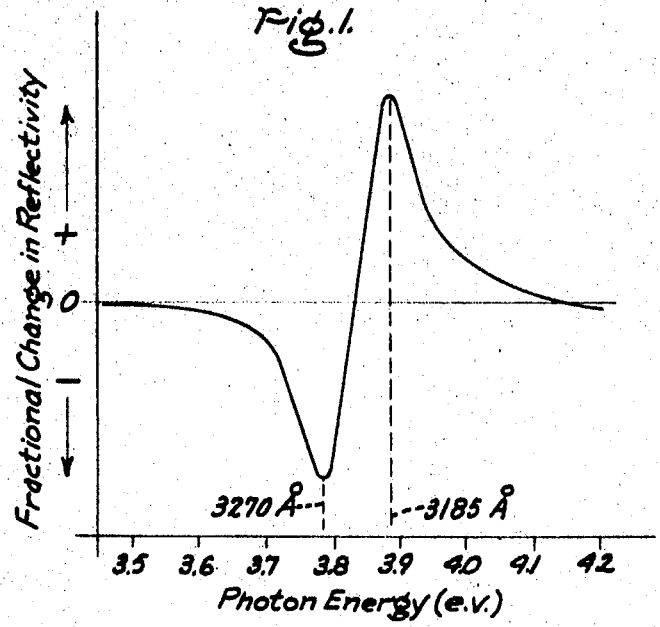
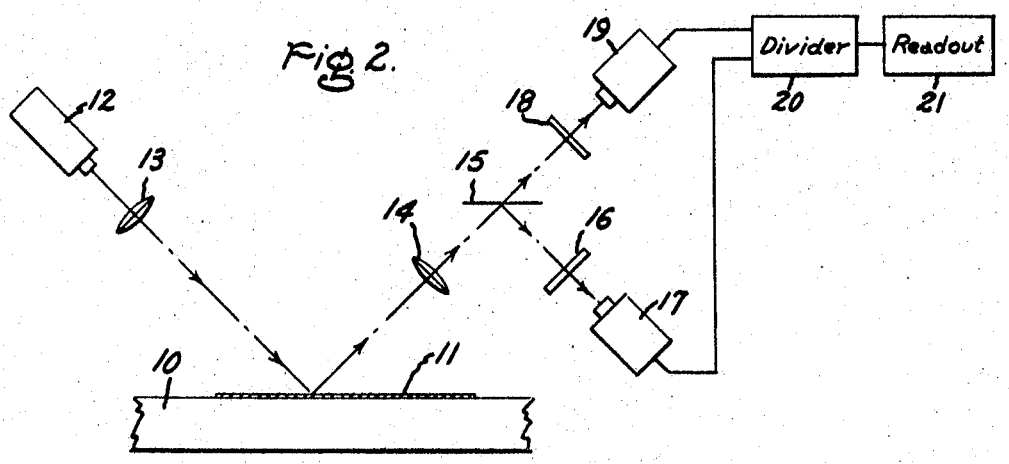
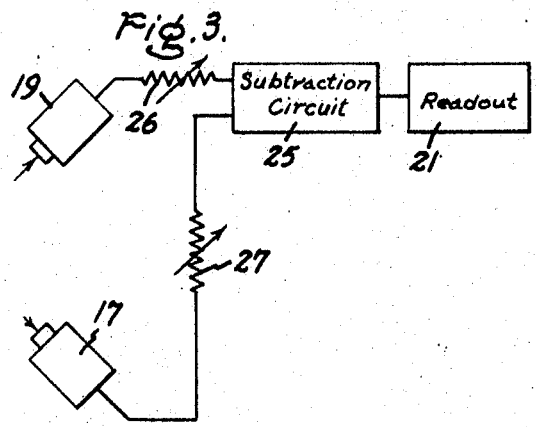
Inventors:
JEROME J. TIEMANN
WILLIAM E. ENGELER
MARVIN GARFINKEL
HELLMUT FRITZSCHE
by John F. Ahern
Their Attorney.

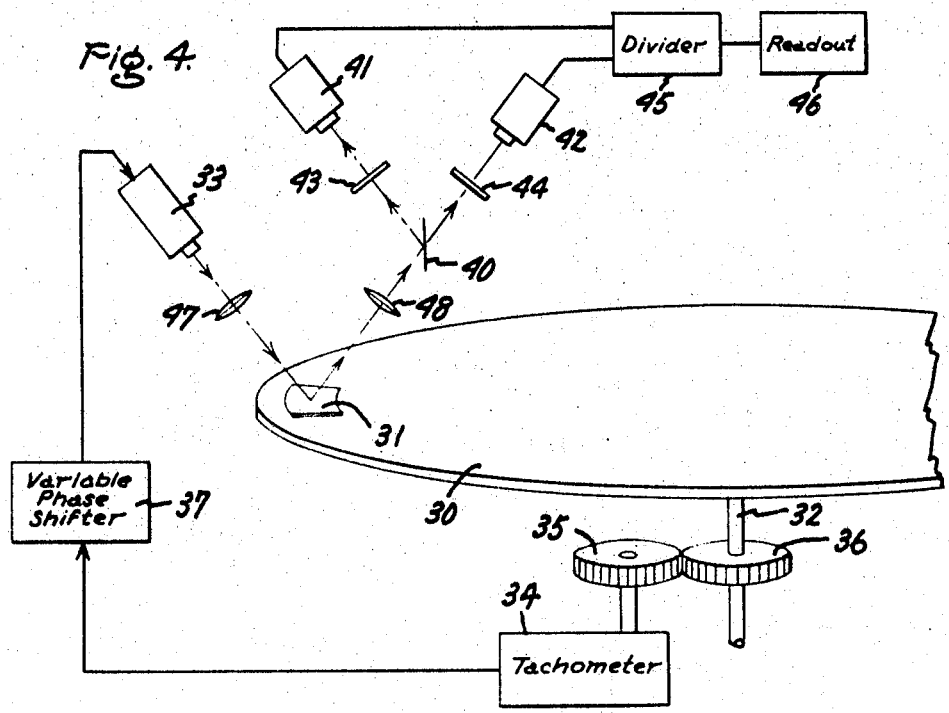
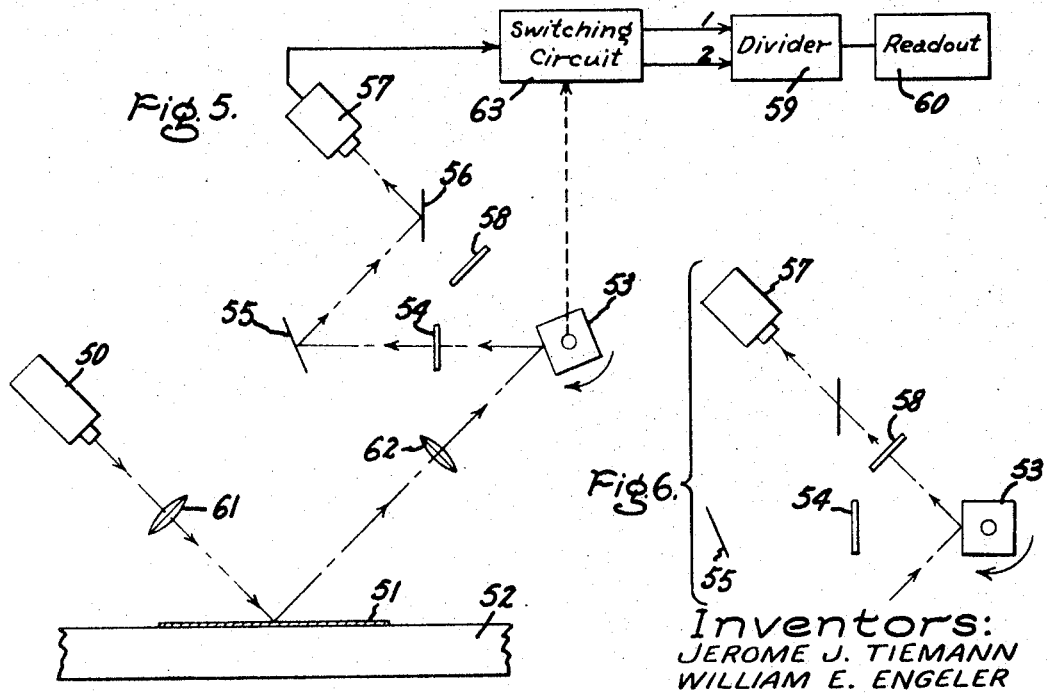

3,462,223
OPTICAL STRAIN GAUGE
Jerome J. Tiemann, Burnt Hills, William E. Engeler, Scotia, and Marvin Garfinkel, Schenectady, N.Y., and Hellmut Fritzsche, Chicago, Ill., assignors to General Electric Company, a corporation of New York
Filed Oct. 21, 1965, Ser. No. 499,391
Int. Cl. G01b 11/16
U.S. Cl. 356—32      16 Claims

ABSTRACT OF THE DISCLOSURE

Strain in a member is measured optically by depositing a piezoreflective film on the member being strained and directing optical energy upon the film. The spectrum of optical energy includes a wavelength at which the fractional change in reflectivity of the film exhibits a maximum. The reflected light is detected by light sensing means responsive to this wavelength, enabling the light sensing means to produce an output signal analogue of strain in the member.

---

This invention relates to strain gauges, and more particularly to optical systems utilizing the piezoreflective effect for determining strain at the surface of a strained member.

In many strain gauge applications, there are distinct advantages to possessing a capability for measuring strain without making physical contact with the strained member. Among these advantages is the capability of obtaining a greater degree of accuracy, since no external stress is applied. Moreover, since there is no electrical power supplied to the strained member, there is no electrical resistance heating therein. Furthermore, in some applications, such as measurement of strain in a moving member, it is difficult or even impossible to make physical contact with the strained surface. By utilizing an optical form of strain gauge, the necessity of making physical contact with the strained member is obviated and the foregoing advantages are obtained, along with an attendant increase in measurement accuracy and reliability.

The optical strain gauge of this invention operates on the principle that optical reflectivity of a substance is, in general, changed by stress. The phenomenon based upon this principle is denominated herein as "the piezoreflective effect." The actual changes which occur depend upon type of stress, band structure of the stressed material, and wavelength of incident light, and are most pronounced at wavelengths near the onset of direct interband transitions. For a discussion of the band theory of solids, see, for example, Introduction to Solid State Physics by C. Kittel, John Wiley and Sons, Second Edition, 1956. The invention described herein utilizes the piezoreflectance effect with sufficient sensitivity to provide practical and accurate measurements of extremely weak strains and enables detection of vibratory strains occurring at frequencies higher than have heretofore been capable of detection.

Accordingly, one object of this invention is to provide a method and apparatus for optically measuring strain manifested at the surface of a mechanical member.

Another object is to provide strain measuring apparatus which utilizes the piezoreflective effect in obtaining sensitive strain measurements.

Another object is to provide apparatus for accurately measuring strain in a stationary or moving member without making physical or electrical contact thereto.

Another object is to provide an optical strain gauge capable of accurately measuring vibratory strains occurring at very high frequencies.

Briefly stated, in accordance with the invention, optical strain sensing apparatus for measuring strain in a mechanical member is provided, and, in one aspect, comprises a film of piezoreflective material adheringly deposited on the surface of the member, which may be a polycrystalline film such as is commonly produced by evaporation or electroplating, and a source of optical energy directed onto the film. The optical energy is characterized by an electromagnetic spectrum including at least the wavelength at which either positive or negative fractional change in reflectivity respectively for any given strain in the film is substantially maximum. Light sensing means producing signals in response to optical energy of the aforesaid wavelength reflected from the film are also provided, along with circuit means responsive to the sensing means for producing an output signal analogue of strain in the member.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGURE 1 is a graph of fractional change of reflectivity of silver stressed in tension vs. photon energy of light directed thereon;

FIGURE 2 is a schematic illustration of the novel optical strain gauge as used for measuring strain in a stationary member;

FIGURE 3 illustrates a modification of the embodiment of FIGURE 2;

FIGURE 4 is a schematic illustration of one operating condition of the optical strain gauge of the invention as used for measuring strain in a rotating member; and FIGURES 5 and 6 are schematic illustrations of another embodiment of the optical strain gauge of the invention wherein only a single light detector is utilized.

FIGURE 1 is a graphical representation of fractional change of reflectivity of silver undergoing a steady-state tensile strain, plotted with respect to the wavelength of incident light having photon energy in the range of 3.45–4.20 electron volts. This range of energy encompasses the reflectivity minimum for silver, which occurs at approximately 3.8 electron volts. It should be noted that the peak negative fractional change of reflectivity occurs at a wavelength of 3270 angstrom units and the peak positive fractional change of reflectivity occurs at a wavelength of 3185 angstrom units, when the silver is stressed in tension. It has been determined that the magnitudes of positive and negative fractional changes in reflectivity vary in direct proportion to the applied strain so that the peaks of the curve become more pronounced as strain increases, and it is this fact which constitutes the basis of operation for the novel strain gauge herein disclosed. Since the net fractional change in reflectivity in this region of wavelengths is approximately 300 times the uniformly applied strain, the "gauge factor," or ratio of the net fractional change in reflectivity to the uniformly applied strain, is approximately 300. In general, the "gauge factor" depends upon the nature of the strain to be measured, the direction of polarization of the light, and the composition of the reflecting surface, so that suitable calibration of the gauge is necessary. In the case of normal light incidence and uniform strain, there is no polarization dependence. Uniform strain is here taken to mean any surface strain causing the surface to expand in equal amounts in every direction along the surface. For non-uniform strain, information about the nature of the strain may be deduced from two measurements made with two orthogonal polarizations of light, respectively. In the event a compressive stress is applied to the silver, the polarity of the fractional change of reflectivity peaks reverses, resulting in a positive peak at 3270 angstrom units and a negative peak at 3185 angstrom units, with the magnitudes of the peaks varying in direct proportion to strain.

FIGURE 2 illustrates use of the optical strain gauge of the invention in measuring strain of a stationary member 10. This member comprises a substrate, such as a metal for example, adapted to be stressed by an applied force. A thin film 11 of appropriate piezoreflective metal, such as copper, silver, gold, or an alloy of these metals as, for example, a gold and silver alloy, is evaporated onto the substrate. Use of silver entails the necessity of preventing tarnish by applying a transparent protetcive coating thereon, such as lacquer or a magnesium oxide film. Alternatively, use of a gold and silver alloy may be attractive, in that it combines the inertness of gold with the high reflectivity of silver, lessening the necessity of a protective coating. For purposes of illustration, it will be assumed hereinafter that the film is comprised of silver, appropriately protected against tarnish. Although the film thickness is not critical, it is preferably in the order of one micron, since a thinner film would no longer be opaque to optical energy.

A source of light 12 producing a spectrum including at least wavelengths of 3185 angstrom units and 3270 angstrom units is directed onto the surface of the silver film. The incident beam may be collimated by suitable optics, indicated by lens 13. The beam reflected from the silver film may be collimated by suitable optics, indicated by lens 14, polarized by an appropriate polarizer if desired, and directed to a beam splitter 15. Each beam splitter comprises a mirror coated so as to transmit approximately half of the light falling upon it at normal incidence and reflect approximately half. The beam splitters are also suitably fabricated to absorb only a minimum amount of optical energy in the wavelength region appropriate to the piezoreflective film. For a piezoreflective film of silver, the beam splitters are preferably coated with aluminum or some other highly reflective material having low energy absorption in the vicinity of the wavelength at which the reflectivity minimum for silver occurs. Therefore, although beam splitters are sometimes referred to as "half-silvered mirrors," the beam splitters of the present invention are preferably not coated with silver.

A portion of the beam reflected from the silver film is reflected by beam splitter 15 through an interference filter 16 to a first photo-sensitive detector 17 such as a photomultiplier. The remaining portion of the beam reflected from the film of silver is passed through beam splitter 15 and a second interference filter 18 to a second photo-sensitive detector 19, such as a photomultiplier. Interference filters 16 and 18 are selected to pass radiation having wavelengths of 3185 angstrom units and 3270 angstrom units, respectively, each interference filter preferably having a two percent bandwidth centered at its respective transmission wavelengths. It should be noted that monochromators or a spectrometer might be used in place of the interference filters, if preferred.

Electrical output signals provided by photomultipliers 17 and 19 are supplied to a divider circuit 20, and output of the divider circuit is supplied to suitable readout apparatus 21, such as a properly calibrated meter. The output signal produced by the divider circuit is a ratio of the intensity of light having a wavelength of 3270 angstrom units, sensed by photomultiplier 19, to the intensity of light having a wavelength of 3185 angstrom units, sensed by photomultiplier 17.

In operation, assuming first that member 10 is unstrained and light intensity is sensed by photomultipliers 19 and 17, the signal supplied by divider 20 to readout 21 represents a particular ratio. In the event beam splitter 15 passes 50 percent of the light supplied to it and reflects the remaining 50 percent, this ratio is one-to-one. In the event beam splitter 15 does not pass an amount of light equal to the amount which it reflects, the ratio is altered accordingly. Whatever ratio is produced thereby is conveniently selected as the zero strain level.

If member 10 is now strained in tension for example, the film of silver, which adheres over its entire surface to member 10, is also strained in tension, so that the magnitude of output signal produced by photomultiplier 19 decreases and the magnitude of output signal produced by photomultiplier 17 increases in accordance with the curve of FIGURE 1. Thus, there is a change in output of divider circuit 20 which is proportional to the strain at the surface of member 10, and this signal is supplied to readout apparatus 21. This may be seen from the following:

Let:
$I_1$=intensity of incident radiation of 3270 angstrom units,
$I_2$=intensity of incident radiation of 3185 angstrom units,
$R_1$=reflectivity of the silver film to radiation of 3270 angstrom units,
$R_2$=reflectivity of the silver film to radiation of 3185 angstrom units, and
$\delta_1$ and $\delta_2$=absolute fractional change in reflectivity of silver to radiation of 3185 angstrom units and 3270 angstrom units, respectively, with strain.

Thus, output of photomultiplier 19 is proportional to $$I_1 R_1 (1+\delta_1)$$

and output of photomultiplier 17 is proportional to $$I_1 R_2 (1-\delta_2)$$

Hence, output of divider 20 is proportional to $$\frac{I_1 R_1 (1+\delta_1)}{I_2 R_2 (1-\delta_2)}$$

which may be closely approximated as $$\frac{I_1 R_1}{I_2 R_2}(1+\delta_1+\delta_2)$$

Since a single light source and a single reflecting surface are utilized, fluctuations in the input beam and reflecting surface are cancelled out. Thus, the only variable in the above approximation is the sum $(\delta_1+\delta_2)$ which is proportional to strain at the surface of the member.

In the event only one of the wavelengths at which a peak fractional change of reflectivity occurs, such as 3270 angstrom units, is monitored, output of photomultiplier 19 remains proportional to $$I_1 R_1 (1+\delta_2)$$

Filter 16 is now selected to pass a frequency outside the vicinity of the reflectivity minimum for silver, so that the fractional change of reflectivity at this frequency remains zero, regardless of strain. Thus letting $I_3$=intensity of incident radiation at the new frequency passed by filter 16, and $R_3$=reflectivity of the silver-film to radiation at this new frequency, then output of photomultiplier 17 is proportional to $$I_3R_3$$

Hence, output of divider 20 is proportional to $$\frac{I_1R_1}{I_3R_3}(1+\delta_2)$$

Again, since a single light source and a single reflecting surface are utilized, fluctuations in the input beam and reflecting surface are cancelled out, so that the second term of the latter expression is proportional to strain at the surface of member 10.

FIGURE 3 is a modification of the system of FIGURE 2, accomplished by substituting a subtraction circuit 25 for divider circuit 20. Variable resistances 26 and 27 may be provided for coupling photomultipliers 19 and 17 respectively to the inputs of the subtraction circuit. In this embodiment, intensity of one of the split beams is adjusted so that output signals produced by photomultipliers 17 and 19 are equal at zero strain. Alternatively, this result may be accomplished by adjusting resistors 26 or 27 to equalize signals supplied by the photomultipliers to the subtraction circuit. In either case, the electrical signal analogue of $I_1R_1$ equals the electrical signal analogue of $I_2R_2$, so that when film 11 is strained, the signal supplied to readout 21 from subtraction circuit 25 is proportional only to $(\delta_1+\delta_2)I_1R_1$. However, the output sensitivity of subtraction circuit 25 is thus dependent upon the light intensity, which must consequently be maintained at a relatively constant value.

FIGURE 4 illustrates a system for applying the novel optical strain gauge to measurement of surface strain in a rotating member 30. A thin film of silver or other suitable material 31 is evaporated onto the surface of rotating member 30, which is driven through a shaft 32. Optical radiation including wavelengths of 3185 angstrom units and 3270 angstrom units is directed from a stroboscopic light source 33 through collimating lens 47 onto the surface of silver film 31. The stroboscopic light source is synchronized with the rotation of member 30 by suitable means such as a mechanical tachometer driven in synchronism with drive shaft 32 through a pair of meshed gears 35 and 36. Alternatively, an optical tachometer photoelectrically sensing a spot on member 30 each time the spot passes the sensor may be utilized to synchronize the stroboscopic light source to rotation of member 30. A variable phase shifting network 37 controls the times at which stroboscopic light source 33 is energized, assuring that light is produced only when member 30 passes through the proper rotational position. Thus the silver film is illuminated, not the remainder of the rotating member. Alternatively, however, the entire surface of the rotating member, or any portion thereof, may be coated with the silver film, enabling strain data to be obtained from any number of points thereon.

In a manner similar to that previously described, light reflected from the silver film passes through collimating lens 48 and is partially reflected from a beam splitter 40 to a photomultiplier 41. The remaining portion of light reflected from silver film 31 is passed through beam splitter 40 to photomultiplier 42. Light received by photomultiplier 41 is filtered by a two percent bandwidth interference filter 43, or monochromator, centered at a wavelength of 3270 angstrom units, while light received by photomultiplier 42 is filtered by a two percent bandwidth interference filter 44, or monochromator, centered at a wavelength of 3185 angstrom units.

Outputs of photomultipliers 41 and 42 are supplied to a divider circuit 45 in a manner similar to that described in conjunction with the embodiment of FIGURE 2, which, in turn, supplies an output to readout apparatus 46. The function of divider circuit 45, although identical to that of FIGURE 2, may, if desired, be synchronized to the operation of the stroboscopic light source by, for example, inserting a gate circuit in each of the two input circuits to the divider and operating the gate circuits from variable phase shifter 37 in synchronism with stroboscopic light source 33. Thus, during only a small portion of each cycle of rotation of member 30, divider circuit 45 provides an output signal which is proportional to strain at the surface of rotating member 30 beneath film 31. This signal, therefore, contains strain information in the form of amplitude modulated pulses. In such operation, however, light source 33 may provide steady illumination, rather than stroboscopic.

Operation of the embodiment illustrated in FIGURE 4 is substantially identical to operation of the embodiment illustrated in FIGURE 2, with the exception that light is supplied to photomultipliers 41 and 42 only during a brief portion of each cycle of rotation of member 30. Strains due to other forms of motion, such as oscillatory, may be measured by driving member 30 in an oscillatory fashion, rather than rotational. Similarly, mechanical resonance or vibration, even at very high frequencies, may be readily detected, since inertia added to the vibrating member by the thin film of piezoreflective material is too slight to have an appreciable effect upon either the amplitude or frequency of this vibration.

FIGURES 5 and 6 illustrate still another embodiment of the strain gauge of the invention, wherein but a single photosensitive light detector or photomultiplier 57 is used. Thus, optical radiation including wavelengths of 3185 angstrom units and 3270 angstrom units is directed from a source 50 through a collimating lens 61 onto a film of silver or other suitable reflective material 51 deposited on a substrate 52 comprising the member to be strained. Light reflected from the surface of film 51 is collimated through a lens 62 and reflected from a rotating mirror 53. This mirror is constructed in the form of a polyhedron having reflective outer surfaces, and may be of square cross-sectional configuration as illustrated. When rotating mirror 53 is in the position illustrated in FIGURE 5, light is reflected therefrom through a two percent bandwidth interference filter 54, centered at a wavelength of 3185 angstrom units, to a stationary mirror 55. Thus, light of 3185 angstrom units in wavelength is reflected from mirror 55 to a beam splitter 56, and a portion of the 3185 angstrom units light is reflected therefrom to photomultiplier 57. A second two percent bandwidth interference filter 58, centered at a wavelength of 3270 angstrom units is also provided; however, with the position of rotating mirror 53 as shown, no light reaches filter 58.

Output signals from photomultiplier 57 are supplied to a switching circuit 63 which is synchronized with rotation of mirror 53. Thus, when light is passed through filter 54, switching circuit 63 couples the signal from photomultiplier 57 through a conductor 1 to a first input of a divider circuit 59. On the other hand, when rotating mirror 53 reaches the position illustrated in FIGURE 6, light of 3270 angstrom units in wavelength is passed through filter 58 and beam splitter 56 to photomultiplier 57, and the output signal produced by the photomultiplier is coupled by switching circuit 63 through a conductor 2 to a second input of divider circuit 59. Thus, photomultiplier 57 detects light which alternately passes through filters 54 and 58. It will be noted that the rotating and stationary mirrors could be supplanted by means alternately moving filters 54 and 58 into the beam reflected from the silver to the photomultiplier, and such system is within the contemplation of this invention.

The advantage of using a single photomultiplier, in addition to those of low cost and simplicity, is that with a single detector, electrical fluctuation and fluctuations in sensitivity of the photomultiplier can be cancelled out. Since these fluctuations are entirely uncorrelated in two separate detectors, it is less difficult to avoid their effect when but one detector is used instead of two.

Divider circuit 59 is preferably constructed with delay circuitry in the first input thereto, so that the signal supplied to the first input is retained until a signal is supplied to the second input. When both inputs of the divider circuit are energized, an output signal proportional to strain at the surface of member 52 is supplied to readout apparatus 60.

The foregoing describes a method and apparatus for optically measuring strain at the surface of a physical member. The invention utilizes apparatus which operates on the piezoreflective effect, and is capable of accurately measuring strain at up to very high frequencies in a stationary or moving member without making physical or electrical contact thereto. It should be noted that if the strained member is composed of piezoreflective material, surface strain measurements may be performed directly thereon, without recourse to deposition of piezoreflective material onto the surface of the member.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What we claim as new and desire to secure by Letters Patent of the United States is:

1. Optical strain sensing apparatus for measuring strain in a mechanical member and comprising: a film of piezoreflective material adheringly deposited on the surface of said member; a source of optical energy directed to impinge upon said film, said optical energy including an electromagnetic spectrum containing first and second wavelengths at which both positive and negative fractional changes in reflectivity respectively for any given strain in said film are substantially maximum; light detecting means respectively producing first and second signals in response to optical energy of said first and second wavelengths reflected from said film; and circuit means responsive to said light detecting means for combining said first and second signals to produce an output signal analogue of strain in said member.

2. The optical strain sensing apparatus of claim 1 wherein said piezoreflective material consists of silver.

3. The optical strain sensing apparatus of claim 1 wherein said piezoreflective material is selected from the group consisting of copper, silver and gold.

4. The optical strain sensing apparatus of claim 3 wherein said circuit means comprises a divider circuit for providing a quotient of said first and second signals.

5. The optical strain sensing apparatus of claim 3 wherein said circuit means comprises a subtraction circuit for providing the difference between said first and second signals.

6. Optical strain sensing apparatus for measuring strain in a moving mechanical member and comprising: a film of piezoreflective material adheringly deposited on the surface of said member; a source of optical energy directed to impinge upon said film, said optical energy including an electromagnetic spectrum containing first and second wavelengths at which both positive and negative fractional changes in reflectivity respectively for any given strain in said film are substantially maximum; light detecting means respectively producing first and second signals in response to optical energy reflected from said film simultaneously at periods occurring in synchronism with motion of said member; and circuit means responsive to said light detecting means for combining said first and second signals to produce an output signal analogue of strain in said moving member.

7. The optical strain sensing apparatus of claim 6 wherein said piezoreflective material is selected from the group consisting of copper, silver and gold.

8. Optical strain sensing apparatus for measuring strain in a rotating mechanical member and comprising: a film of piezoreflective material adheringly deposited on the surface of said member; a source of optical energy synchronized to said rotating member to direct optical energy onto said film each time said member passes through a predetermined rotational position, said optical energy including an electromagnetic spectrum containing first and second wavelengths at which both positive and negative fractional changes in reflectivity respectively for any given strain in said film are substantially maximum; light detecting means respectively producing first and second signals in response to optical energy of said first and second wavelengths reflected from said film; and circuit means responsive to said light detecting means for combining said first and second signals to produce an output signal analogue of strain in said rotating member.

9. The optical strain sensing apparatus of claim 8 wherein said piezoreflective material consists of silver.

10. The optical strain sensing apparatus of claim 9 wherein said circuit means comprises a divider circuit for providing a quotient of said first and second signals.

11. A system for optically measuring strain in a mechanical member and comprising: a thin polycrystalline film of silver adheringly deposited on the surface of said member; a source of optical energy directed to impinge upon said film, said optical energy including an electromagnetic spectrum containing first and second wavelengths at which both positive and negative fractional changes in reflectivity respectively for any given strain in silver are substantially maximum; first and second photomultipliers; first and second optical filters respectively passing said first and second wavelengths of light reflected from said film to said first and second photomultipliers respectively; and circuit means responsive jointly to both said photomultipliers for producing an output signal analogue of strain in said member.

12. Optical strain sensing apparatus for measuring strain in a mechanical member and comprising: a film of piezoreflective metal adheringly deposited on the surface of said member; a source of optical energy directed to impinge upon said film, said optical energy including an electromagnetic spectrum containing wavelengths at which both positive and negative fractional changes in reflectivity respectively for any given strain in said film are substantially maximum; light sensing means responsive to optical energy of said wavelengths reflected from said film; and circuit means responsive to said light sensing means for producing an output signal analogue of strain in said member.

13. The optical strain sensing apparatus of claim 12 wherein said piezoreflective metal is selected from the group consisting of copper, silver and gold.

14. A system for optically measuring strain in a mechanical member and comprising: a thin polycrystalline film of silver adheringly deposited on the surface of said member; a source of optical energy directed to impinge upon said film, said optical energy including an electromagnetic spectrum containing a selected wavelength at which a fractional change in reflectivity of any selected polarity for any given strain in silver is substantially maximum for the selected polarity; photomultiplier means responsive to said selected wavelength of optical energy reflected from said film; and circuit means responsive to said photomultiplier means for producing an output signal analogue of strain in said member.

15. The system of claim 14 wherein said spectrum of said optical energy contains a second wavelength at which a fractional change in reflectivity for any given strain in silver is substantially zero, and said photomultiplier means comprises first and second photomultipliers respectively responsive to said selected wavelength and said second wavelength of optical energy.

16. Optical strain sensing apparatus for measuring strain in a piezoreflective member and comprising: a source of optical energy directed to impinge upon said member, said optical energy including an electromagnetic spectrum containing first and second wavelengths at which both positive and negative fractional changes in reflectivity respectively for any given strain in said member are substantially maximum; light detecting means respectively producing first and second signals in response to optical energy of said first and second wavelengths reflected from said member; and circuit means responsive to said light detecting means for combining said first and second signals to produce an output signal analogue of strain in said member.

References Cited

UNITED STATES PATENTS

| | | |
|---|---|---|
| 2,938,424 | 5/1960 | Herriott. |
| 3,183,359 | 5/1965 | White _____ 250—199 |
| 3,238,839 | 3/1966 | Day. |
| 3,354,702 | 11/1967 | Eisner. |

OTHER REFERENCES

Becker, H., Equipment for Watching Propogating Stress Waves. Rev. of Sci. Inst., vol. 30, No. 12, December 1959; pp. 1107–1109.

Engeler et al., High Sensitvity Piezoreflectivity, Physical Rev. Letters, vol. 14, No. 26, June 28, 1965; pp. 1069–1072.

RONALD L. WIBERT, Primary Examiner

J. ROTHENBERG, Assistant Examiner

U.S. Cl. X.R.

73—88